(12) United States Patent
Kanaoka et al.

(10) Patent No.: US 12,277,525 B2
(45) Date of Patent: *Apr. 15, 2025

(54) INFORMATION PROCESSING SYSTEM AND INFORMATION PROCESSING METHOD

(71) Applicant: TOYOTA JIDOSHA KABUSHIKI KAISHA, Aichi-ken (JP)

(72) Inventors: Kei Kanaoka, Nagoya (JP); Shun Maeda, Nisshin (JP); Yoshihiro Murozaki, Nisshin (JP); Hiroko Tsujimura, Nagoya (JP); Daiki Kaneichi, Nisshin (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,479

(22) Filed: Jun. 28, 2023

(65) Prior Publication Data

US 2023/0342704 A1 Oct. 26, 2023

Related U.S. Application Data

(63) Continuation of application No. 16/208,878, filed on Dec. 4, 2018, now Pat. No. 11,727,343.

(30) Foreign Application Priority Data

Dec. 7, 2017 (JP) .................................. 2017-235086

(51) Int. Cl.
*G06Q 10/0833* (2023.01)
*G06Q 10/0835* (2023.01)
(Continued)

(52) U.S. Cl.
CPC ...... *G06Q 10/0833* (2013.01); *G06Q 10/0835* (2013.01); *G07C 9/00896* (2013.01); *H04W 4/021* (2013.01); *H04W 4/35* (2018.02)

(58) Field of Classification Search
CPC . G06Q 10/0833; G06Q 10/0835; H04W 4/35; H04W 4/021; G07C 9/00896
See application file for complete search history.

(56) References Cited

U.S. PATENT DOCUMENTS

| 10,643,171 B1* | 5/2020 | Zhang ............... G06Q 10/08355 |
| 2008/0004995 A1* | 1/2008 | Klingenberg ...... G06Q 10/0832 705/28 |

(Continued)

FOREIGN PATENT DOCUMENTS

| CN | 106952064 A | 7/2017 |
| CN | 106997518 A | 8/2017 |
| JP | 2006-206225 | 8/2006 |

OTHER PUBLICATIONS

Ramon Ray, "Amazon Wants the Keys to Your Car: The Retail Giant Plans to Deliver Packages in Customers' Trunks", May 18, 2015, The Savvy Shipper, https://online-shipping-blog.endicia.com/amazon-trunk-delivery-ecommerce-trends/ (Year: 2015).*

*Primary Examiner* — Ibrahim N El-Bathy
(74) *Attorney, Agent, or Firm* — Oblon, McClelland, Maier & Neustadt, L.L.P.

(57) ABSTRACT

An information processing system includes: a collection/delivery request portion configured to notify, to a terminal of a carrier who collects or delivers a package, information on a collection/delivery area where the package is requested to be collected or delivered; a vehicle detection portion configured to detect that the delivery vehicle has moved into the collection/delivery area; and a collection/delivery management portion configured to, when the vehicle detection portion detects that the delivery vehicle has moved into the (Continued)

collection/delivery area, notify the terminal of the carrier of information on a parking position of a collection/delivery destination vehicle.

18 Claims, 7 Drawing Sheets

(51) Int. Cl.
*G07C 9/00* (2020.01)
*H04W 4/021* (2018.01)
*H04W 4/35* (2018.01)

(56) References Cited

U.S. PATENT DOCUMENTS

| | | | |
|---|---|---|---|
| 2015/0302495 A1* | 10/2015 | Stuckman | G01S 5/0284 |
| | | | 705/26.35 |
| 2016/0099927 A1 | 4/2016 | Oz | |
| 2016/0350711 A1 | 12/2016 | Tsao | |
| 2017/0017920 A1 | 1/2017 | Stark | |
| 2018/0240067 A1* | 8/2018 | Oz | G07C 9/00182 |
| 2019/0311327 A1 | 10/2019 | Habbaba | |
| 2020/0074396 A1* | 3/2020 | Boccuccia | G06K 7/1426 |
| 2020/0090117 A1 | 3/2020 | Luo | |

* cited by examiner

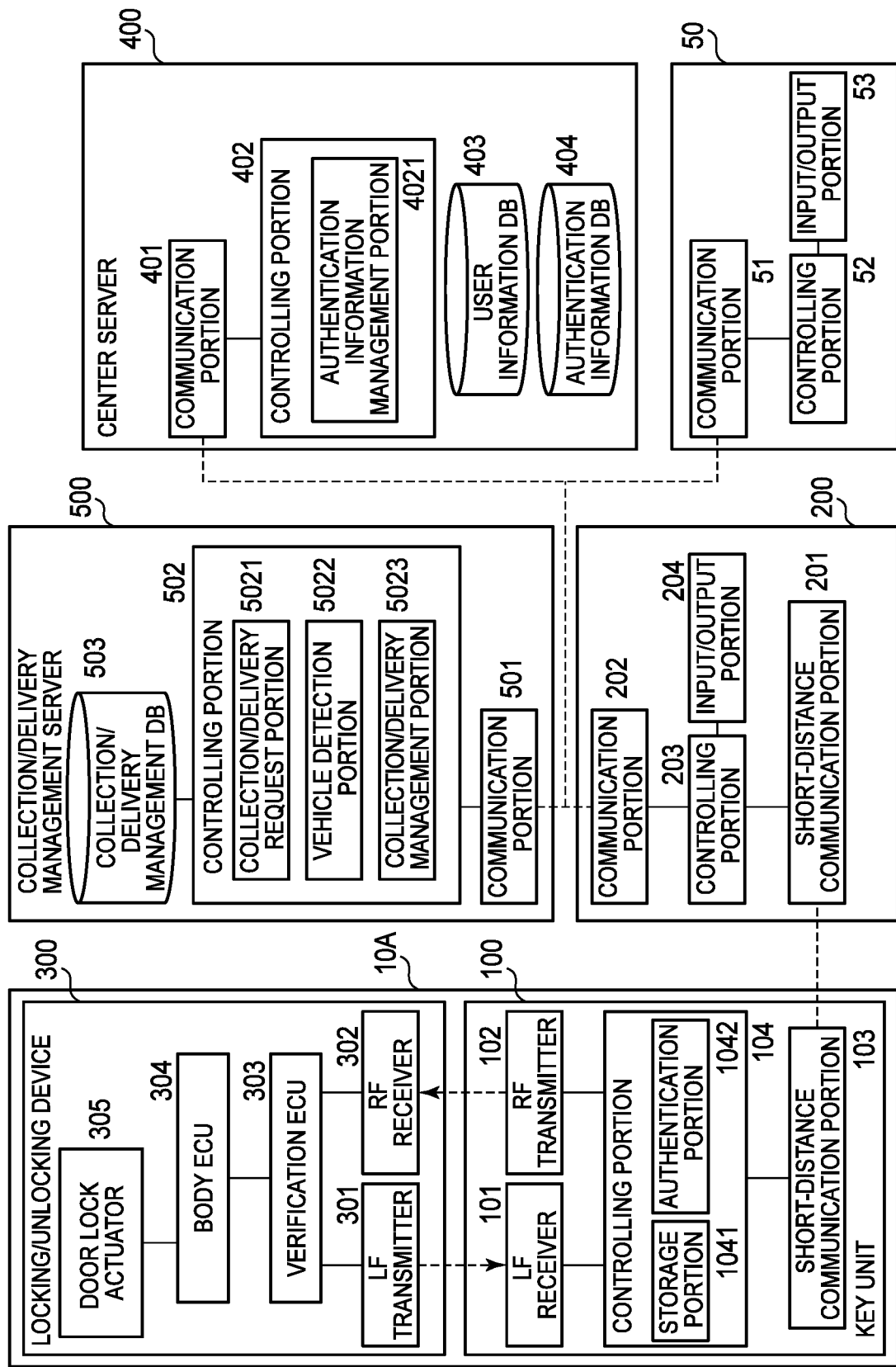

FIG. 3

| | | |
|---|---|---|
| | COLLECTION/DELIVERY INFORMATION REGISTRATION SCREEN | SC1 |
| SC11 | USER ID : S001<br>FULL NAME : ○○△△ | |
| SC12 | COLLECTION/DELIVERY PACKAGE ID : | (SLIP NO.) |
| SC13 | COLLECTION/DELIVERY CATEGORY : | DELIVERY ▼ |
| SC14 | COLLECTION/DELIVERY DESTINATION VEHICLE : | ▼ |
| SC15 | VEHICLE POSITION : | AA, 1th STREET -* |
| SC16 | COLLECTION/DELIVERY AREA : | AA, 1th STREET |
| SC17 | COLLECTION/DELIVERY UNNECESSARY AREA : | BB-CITY, CC-PREF. |
| | | REGISTRATION (SC18) |

FIG. 4

| CLIENT USER ID | COLLECTION/ DELIVERY PACKAGE ID | COLLECTION/ DELIVERY CATEGORY | DELIVERY/ COLLECTION DATE AND TIME | COLLECTION/ DELIVERY DESTINATION VEHICLE ID | COLLECTION/ DELIVERY AREA | COLLECTION/ DELIVERY UNNECESSARY AREA | COLLECTION/ DELIVERY STATUS |
|---|---|---|---|---|---|---|---|
| S001 | P5001 | DELIVERY | 2017/11/01 12:00–15:00 | C0123 | AA, 1th STREET | BB-CITY | COMPLETED |
| S001 | P5002 | COLLECTION | 2017/11/02 18:00–20:00 | C0122 | ... | ... | UNCOMPLETED |
| S001 | P5003 | DELIVERY | 2017/11/03 9:00–12:00 | C0123 | ... | ... | SUSPENDED |

FIG. 5

| CLIENT USER ID | COLLECTION/ DELIVERY DESTINATION VEHICLE ID | VEHICLE TYPE | COLOR | NUMBER | VEHICLE POSITION |
|---|---|---|---|---|---|
| S001 | C0123 | ... | WHITE | XXYY | ... |
| S001 | C0122 | ... | BLUE | YYZZ | ... |

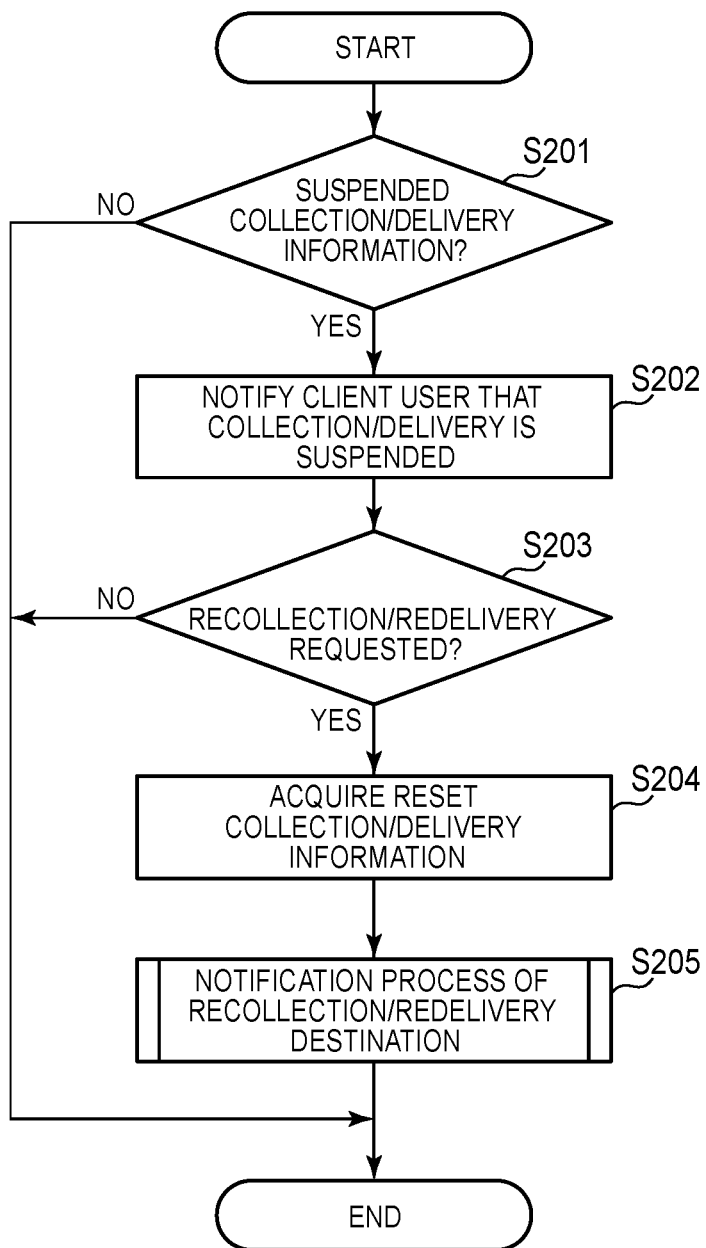

INFORMATION PROCESSING SYSTEM AND INFORMATION PROCESSING METHOD

INCORPORATION BY REFERENCE

This application is a continuation of U.S. patent application Ser. No. 16/208,878 filed Dec. 4, 2018, which is based upon and claims the benefit of priority of Japanese Patent Application No. 2017-235086 filed on Dec. 7, 2017, the entire contents of each of which are incorporated herein by reference in their entirety.

BACKGROUND

1. Technical Field

The disclosure relates to an information processing system and an information processing method for restraining an unnecessary notification of vehicle positional information when a vehicle designated by a utilizer is used as a collection/delivery place for a parcel.

2. Description of Related Art

In recent years, a trunk share system in which a cargo room of a vehicle designated by a utilizer is used as a collection/delivery place for a parcel has been developed as means to effectively perform collection and delivery of a parcel (package) between a utilizer of a collection/delivery service and a parcels delivery company. For example, Japanese Unexamined Patent Application Publication No. 2006-206225 (JP 2006-206225 A) proposes a system in which, at the time of collection or delivery of a parcel, an authentication process is performed between a collection/delivery communication device for the parcels delivery company and a vehicle communication device provided in the designated vehicle, and when the authentication is successful, the designated vehicle can be locked or unlocked.

SUMMARY

Here, in a system in which packages are collected and delivered by use of a vehicle, like the above trunk share system, after positional information on a vehicle (hereinafter also referred to as a collection/delivery destination vehicle) designated by a utilizer as a collection/delivery place for a package is notified to the parcels delivery company, when the utilizer changes the position of the collection/delivery destination vehicle, the positional information on the collection/delivery destination vehicle notified first to the parcels delivery company becomes needless. For example, when the utilizer sets a home parking space as the position of the collection/delivery destination vehicle, positional information on the home parking space is notified to the parcels delivery company. After that, when the utilizer changes the position of the collection/delivery destination vehicle to another location, the position of the home parking space is kept known to the parcels delivery company although the notification is unnecessary. From the viewpoint of privacy protection, it is desirable to prevent information related to the privacy of the utilizer from being provided unnecessarily.

Further, in a delivery system in which a package is delivered or collected by tracking a vehicle designated as a collection/delivery destination, even if a utilizer is in an area where the utilizer does not want to be tracked as the collection/delivery destination, positional information of the collection/delivery destination vehicle may be provided to the parcels delivery company.

The disclosure provides a technique that can prevent unnecessary provision of positional information of a vehicle designated as a collection/delivery destination of a package so that the privacy of a utilizer can be protected.

According to the applicants of the disclosure, when a delivery vehicle for collecting and delivering packages moves in a collection/delivery area requested by a utilizer for collection/delivery of a package, information of a parking position of a vehicle designated by the utilizer as a collection/delivery destination of the package is notified to a terminal of a carrier.

A first aspect of the disclosure relates to an information processing system and the information processing system includes a collection/delivery request portion, a vehicle detection portion, and a collection/delivery management portion. The collection/delivery request portion is configured to notify, to a terminal of a carrier who collects or delivers a package, information on a collection/delivery area where a utilizer who requests collection or delivery of the package wants the package to be collected or delivered. The vehicle detection portion is configured to detect that a delivery vehicle by which the carrier collects or delivers the package has moved into the collection/delivery area. The collection/delivery management portion is configured to, when the vehicle detection portion detects that the delivery vehicle has moved into the collection/delivery area, notify the terminal of the carrier of information on a parking position of a collection/delivery destination vehicle designated by the utilizer as a collection/delivery destination of the package.

In the information processing system, it is assumed that a vehicle is used as a collection/delivery place for a package. Collection/delivery of a package includes a case where a package to a utilizer is delivered to the utilizer and a case where a package sent out by a utilizer is collected. The collection/delivery area is an area or district within a predetermined range where the utilizer wants the package to be collected or delivered. The collection/delivery area is designated by a city/ward/town/village, a zip code, or the like, for example. The information processing system notifies the carrier of the package (the terminal of the carrier) of information on the collection/delivery area including the predetermined range without notifying specific positional information such as a parking position and the like of a vehicle designated as a collection/delivery destination. When the collection/delivery destination is not designated specifically, the carrier can start moving to the collection/delivery area. When the delivery vehicle has moved into the collection/delivery area, the information processing system notifies the terminal of the carrier of the parking position of the collection/delivery destination vehicle. That is, until the delivery vehicle has moved into the collection/delivery area, information on a specific parking position of the collection/delivery destination vehicle is not notified to the carrier. On this account, in a case where collection/delivery is cancelled or suspended before the delivery vehicle moves into the collection/delivery area, information on the parking position of the collection/delivery destination vehicle is not provided in an unnecessary manner, so that the privacy of the utilizer can be protected. Further, the utilizer may not specify a final collection/delivery destination at the time of requesting collection/delivery, so that flexible collection/delivery is achievable.

Further, in the above aspect, when the vehicle detection portion detects that the delivery vehicle has moved into the collection/delivery area, the vehicle detection portion may determine whether or not the collection/delivery destination vehicle is present in the collection/delivery area. When the collection/delivery destination vehicle is present in the collection/delivery area, the collection/delivery management portion may notify the terminal of the carrier of the information on the parking position of the collection/delivery destination vehicle, and when the collection/delivery destination vehicle is not present in the collection/delivery area, the collection/delivery management portion may notify the terminal of the carrier of an instruction to suspend the collection or delivery of the package without notifying the terminal of the carrier of the information on the parking position of the collection/delivery destination vehicle. Even in a case where the delivery vehicle has moved into the collection/delivery area, when the collection/delivery destination vehicle is moving, for example, there occurs such a case where the collection/delivery destination vehicle is not present in the collection/delivery area. When the collection/delivery destination vehicle is not present in the collection/delivery area, the collection/delivery is suspended, so that information on the parking position of the collection/delivery destination vehicle is not provided to the carrier in an unnecessary manner, thereby making it possible to protect the privacy of the utilizer.

Further, in the above aspect, the collection/delivery request portion may notify the terminal of the carrier of information on a collection/delivery unnecessary area where the utilizer does not want the package to be collected or delivered. When the vehicle detection portion detects that the collection/delivery destination vehicle has moved into the collection/delivery unnecessary area, the collection/delivery management portion may notify the terminal of the carrier of an instruction to suspend the collection or delivery of the package, without notifying the terminal of the carrier of the information on the parking position of the collection/delivery destination vehicle. Hereby, in a case where the delivery vehicle tracks the collection/delivery destination vehicle so as to collect or deliver the package, the collection or delivery of the package is not permitted in the collection/delivery unnecessary area where the utilizer does not want the package to be collected or delivered by tracking, so that the privacy of the utilizer is protected.

Further, in the above configuration, when the terminal of the carrier is notified of the instruction to suspend the collection or delivery of the package, the collection/delivery management portion may notify the terminal of the utilizer that the collection or delivery of the package is suspended. Hereby, the utilizer can recognize that the collection or delivery of the package is suspended and can request recollection/redelivery.

Further, in the above aspect, when the collection/delivery destination vehicle is not parked, the collection/delivery management portion may transmit, to the terminal of the utilizer, a notification to urge the utilizer to park the collection/delivery destination vehicle. Hereby, when the utilizer parks the vehicle as the collection/delivery destination, the terminal of the carrier can acquire a parking position of the vehicle, so that the carrier can easily collect or deliver the package.

Further, in the above aspect, when the terminal of the carrier is notified of the instruction to suspend the collection or delivery of the package, the collection/delivery management portion may acquire information on the collection/delivery area reset by the terminal of the utilizer. Hereby, the carrier can recollect or redeliver the package that is suspended.

Note that the information processing system according to the aspect of the disclosure may be constituted by one or more processing devices such as computers. In a case where the information processing system is constituted by a plurality of processing devices, respective constituents of the information processing system are provided dispersedly in the processing devices, and the processing devices cooperate with each other to implement processes as the information processing system.

Further, the disclosure can be achieved from the viewpoint of a method. For example, a second aspect of the disclosure relates to an information processing method, and the information processing method includes: notifying, by a computer, to a terminal of a carrier who collects or delivers a package, information on a collection/delivery area requested by a utilizer who requests collection or delivery of the package as a collection/delivery place of the package; detecting that a delivery vehicle by which the carrier collects or delivers the package has moved into the collection/delivery area; and when it is detected that the delivery vehicle has moved into the collection/delivery area, notifying the terminal of the carrier of information on a parking position of a collection/delivery destination vehicle designated by the utilizer as a collection/delivery destination of the package. Note that the technical idea disclosed herein in terms of the information processing system is also applicable to the information processing method as far as no technical disagreement occurs.

With the above aspect, it is possible to prevent unnecessary provision of positional information of a vehicle designated as a collection/delivery destination of a package, so that the privacy of a utilizer can be protected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram schematically exemplifying configurations of an in-vehicle device, a user terminal of a collection/delivery user, a user terminal of a client user, a collection/delivery management server, and a center server that constitute the trunk share system illustrated in FIG. 1;

FIG. 3 is a view exemplifying a collection/delivery information registration screen via which the client user registers collection/delivery information of a package;

FIG. 4 is a view exemplifying data structure of collection/delivery information stored in the collection/delivery management server;

FIG. 5 is a view exemplifying data structure of vehicle management information stored in the collection/delivery management server;

FIG. 7 is a flowchart exemplifying a recollection/redelivery receiving process.

DETAILED DESCRIPTION OF EMBODIMENTS

The following describes a specific embodiment of the disclosure with reference to the drawings. The configurations described in the present embodiment are not intended to limit the technical scope of the disclosure only to them, unless otherwise designated.

First Embodiment

System Configuration

Figure 1:
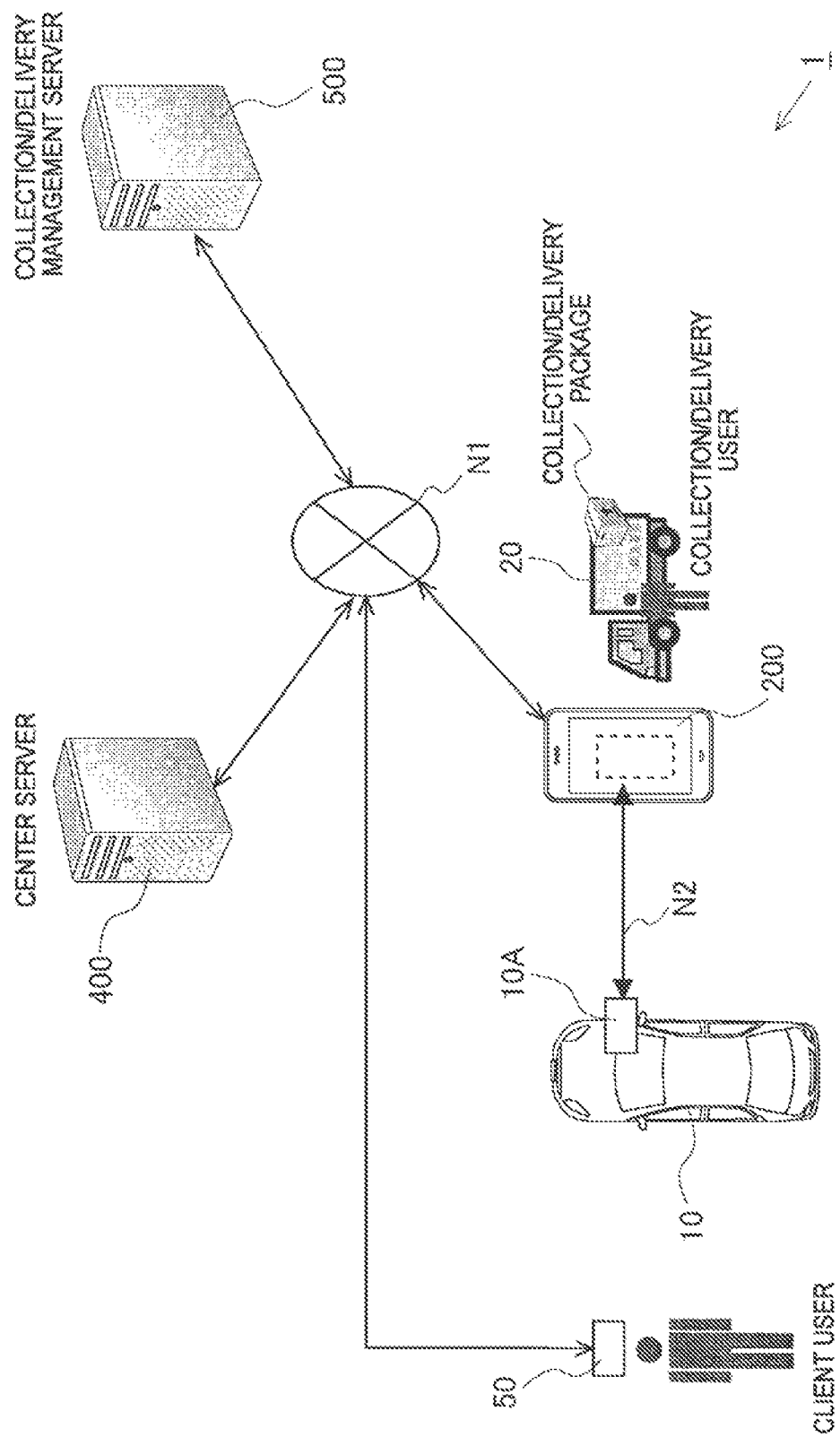
FIG. 1 is a view illustrating a schematic configuration of a trunk share system according to an embodiment of the disclosure.

FIG. 1 is a view illustrating a schematic configuration of a trunk share system 1 according to the present embodiment. The trunk share system 1 is a system for achieving a collection/delivery service in which a cargo room (trunk room) of a vehicle 10 designated by a client who requests a collection/delivery operation of a parcel (package) is shared between the client and a person who performs the requested collection/delivery operation of the parcel, so that the cargo room is used as a collection/delivery place. Accordingly, the "client who requests the collection/delivery operation of the parcel" and the "person who performs the collection/delivery operation of the parcel" are both users who use the cargo room of the vehicle, but in order to distinguish them, the former is referred to as a "client user" and the latter is referred to as a "collection/delivery user." The client user is an example of a "utilizer" and the collection/delivery user is an example of a "carrier." Further, the trunk share system 1 is one example of an "information processing system."

In an example of FIG. 1, the trunk share system 1 includes an in-vehicle device 10A provided in the vehicle 10, a delivery vehicle 20 used for collection and delivery, a user terminal 200 for the collection/delivery user, a user terminal 50 for the client user, a center server 400, and a collection/delivery management server 500. The in-vehicle device 10A, the user terminal 200, the user terminal 50, the center server 400, and the collection/delivery management server 500 are connected mutually via a network N1. Note that the network N1 is a global public communication network such as the Internet, for example, and a wide area network (WAN) or other communication networks may be employed. Further, the network N1 may include a telecommunications network such as a mobile phone and a wireless communication network such as WiFi. Further, the in-vehicle device 10A is connected to the user terminal 200 of the collection/delivery user via a network N2 including short-distance wireless communication and the like. Note that one collection/delivery management server 500 is included in the trunk share system 1 illustratively, but two or more collection/delivery management servers may be included therein. The user terminal 200 of the collection/delivery user is one example of a "terminal of the carrier," and the user terminal 50 of the client user is one example of a "terminal of the utilizer."

The collection/delivery management server 500 receives, from the user terminal 50 of the client user, registration of an article (hereinafter also referred to as a collection/delivery package) to be collected or delivered. For example, in a case where a product purchased on a merchandise purchase site established by an electronic commerce company is delivered as a collection/delivery package by the collection/delivery user, the client user can register collection/delivery information about the collection/delivery package into the collection/delivery management server 500 via an application (hereinafter also referred to as a predetermined application) to use a service by the trunk share system 1, the application being installed in the user terminal 50 of the client user. As will be described later in FIG. 4, the collection/delivery information includes identification information of the client user, information on an area (hereinafter also referred to as an collection/delivery area) where the client user wants the package to be collected or delivered and an area (hereinafter also referred to as a collection/delivery unnecessary area) where the client user does not want the package to be collected or delivered, and so on. The identification information of the client user is also associated, in advance, with the vehicle 10 linked to the client user in the collection/delivery management server 500, and the client user can appropriately select a collection/deliver place to use from possible collection/delivery places related to the client user, including the vehicle 10. The selected collection/delivery place is included in the collection/delivery information. Note that the following description is made on the premise that the collection/delivery place of the client user is the vehicle 10. Further, the collection/delivery information also includes information about the status of the collection/delivery package. As the status information, information on whether collection/delivery of the collection/delivery package is completed or not can be exemplified.

The collection/delivery management server 500 receives a request of collection/delivery of the package from the user terminal 50 of the client user. The collection/delivery management server 500 transmits the collection/delivery information registered by the client user to the user terminal 200 of the collection/delivery user. The collection/delivery user starts moving to the collection/delivery area included in the collection/delivery information. When the collection/delivery management server 500 detects that the delivery vehicle 20 has moved into the collection/delivery area, the collection/delivery management server 500 transmits positional information of the vehicle 10 as a collection/delivery destination to the user terminal 200 of the collection/delivery user. The positional information of the vehicle 10 as the collection/delivery destination can be acquired from the center server 400 based on the positional information of the vehicle 10 included in the collection/delivery information. When the collection/delivery user reaches the vehicle 10, the collection/delivery user requests the center server 400 to issue, to the user terminal 200 of the collection/delivery user, authentication information to lock and unlock the cargo room of the vehicle 10 in which the collection/delivery package is to be accommodated. The request is performed based on a request from the user terminal 200 of the collection/delivery user as a starting point. The center server 400 transmits authentication information of the vehicle 10 associated with the identification information of the client user to the user terminal 200 of the collection/delivery user via the collection/delivery management server 500, based on the identification information of the client user included in the collection/delivery information. The collection/delivery user then locks or unlocks the cargo room of the vehicle 10 by use of the authentication information acquired by the user terminal 200, so that the collection/delivery user can access the cargo room of the vehicle 10 to deliver or collect the collection/delivery package. Here, the authentication information is digital information transferred to the in-vehicle device 10A from the user terminal 200 via short-distance wireless communication and subjected to an authentication process by the in-vehicle device 10A, so that the in-vehicle device 10A executes a locking/unlocking process of the cargo room of the vehicle 10. Further, the locking/unlocking process of the cargo room of the vehicle 10 is a process to cause the in-vehicle device 10A (described later in detail) to lock or unlock the door of the cargo room of the vehicle 10 in which the collection/delivery package is to be accommodated.

FIG. 2 is a block diagram schematically exemplifying configurations of the in-vehicle device 10A, the user terminal 200 of the collection/delivery user, the user terminal 50 of the client user, the collection/delivery management server 500, and the center server 400 that constitute the trunk share system 1. With reference to FIG. 2, hardware configurations and functional configurations of the in-vehicle device 10A, the user terminal 200 of the collection/delivery user, the user terminal 50 of the client user, the collection/delivery management server 500, and the center server 400 will be described.

The in-vehicle device 10A includes a key unit 100 and a locking/unlocking device 300. The key unit 100 has a wireless interface similarly to an electronic key (hereinafter referred to as a portable) of a smart key. By communicating with the existing locking/unlocking device 300 provided in the in-vehicle device 10A, locking and unlocking of the cargo room or a vehicle cabin of the vehicle 10 (hereinafter also referred to as just "locking and unlocking of the vehicle 10" when it is not necessary to distinguish the cargo room from the vehicle cabin) can be performed without using a physical key. Further, the key unit 100 performs short-distance wireless communication with the user terminal 200 of the collection/delivery user and determines whether the key unit 100 functions as an electronic key for the vehicle 10 or not, based on a result of the authentication process performed on the user terminal 200 of the collection/delivery user.

When the user terminal 200 of the collection/delivery user accesses the cargo room of the vehicle 10 to deliver or collect the collection/delivery package, the user terminal 200 requests the center server 400 to issue authentication information to lock and unlock the cargo room via the collection/delivery management server 500 as described above. The authentication information transmitted from the user terminal 200 of the collection/delivery user to the key unit 100 is verified with authentication information stored in the key unit 100 in advance. When the authentication process is successful, the user terminal 200 is accepted as a terminal that can operate the in-vehicle device 10A rightfully. When the user terminal 200 is authenticated, the key unit 100 transmits a key ID of the vehicle 10, stored in advance in the key unit 100 and associated with the authentication information, to the locking/unlocking device 300 together with a locking/unlocking signal. When the key ID received from the key unit 100 agrees with a key ID stored in advance in the locking/unlocking device 300, the locking/unlocking device 300 locks or unlocks the vehicle 10. The key unit 100 and the locking/unlocking device 300 work by electric power supplied from a battery provided in the vehicle 10. Note that the key ID stored in advance in the key unit 100 may be encrypted by the authentication information. In this case, when the authentication process on the user terminal 200 of the collection/delivery user is successful, the key unit 100 may decrypt the key ID by the authentication information and transmit it to the locking/unlocking device 300.

Here, the locking/unlocking device 300 will be described in detail. The locking/unlocking device 300 is a device for locking and unlocking doors of the vehicle cabin and the cargo room of the vehicle 10. For example, the door of the vehicle 10 is locked and unlocked in response to a locking signal and an unlocking signal transmitted from a portable for the vehicle 10 via a radio wave of a radio frequency (hereinafter referred to as RF) band. Further, the locking/unlocking device 300 also has a function to transmit a radio wave of a low frequency (hereinafter referred to as LF) band for searching the portable.

In the present embodiment, instead of the portable, the key unit 100 transmits and receives the RF band and LF band radio waves to and from the locking/unlocking device 300, so as to control locking and unlocking of the door of the vehicle 10. Hereinafter, the description is made on the premise that a communication counterpart of the locking/unlocking device 300 is limited to the key unit 100, unless otherwise specified.

The locking/unlocking device 300 includes an LF transmitter 301, an RF receiver 302, a verification ECU 303, a body ECU 304, and a door lock actuator 305. The LF transmitter 301 is means to transmit a radio wave of a low frequency band (e.g., 100 KHz to 300 KHz) so as to perform searching (polling) of the key unit 100. The LF transmitter 301 is provided near a center console or a handle in the vehicle cabinet, for example. The RF receiver 302 is means to receive a radio wave of a radio frequency band (e.g., 100 MHz to 1 GHz) transmitted from the key unit 100. The RF receiver 302 is provided in any place inside the vehicle cabin.

The verification ECU 303 is a computer for performing a control to lock and unlock the doors of the vehicle cabin and the cargo room of the vehicle 10 based on a signal (a locking signal or an unlocking signal) transmitted from the key unit 100 via the RF band radio wave. The verification ECU 303 is constituted by a microcomputer, for example. Note that, in the following description, the locking signal and the unlocking signal are collectively referred to as a locking/unlocking signal. The term "locking/unlocking signal" indicates at least either one of the locking signal and the unlocking signal.

The verification ECU 303 authenticates that the locking/unlocking signal transmitted from the key unit 100 is transmitted from a rightful device. More specifically, the verification ECU 303 determines whether or not a key ID included in the locking/unlocking signal agrees with a key ID stored in advance in a storage portion (not shown) included in the verification ECU 303. Then, the verification ECU 303 transmits an unlock command or a lock command to the body ECU 304 based on the result of the determination. The unlock command or the lock command is transmitted via an in-vehicle network such as a controller area network (CAN).

The door lock actuator 305 is an actuator configured to lock and unlock doors of the vehicle 10 (a vehicle-cabin door opened and closed when a passenger gets in and off the vehicle cabin as a passenger space and a cargo-room door opened and closed at the time of loading and unloading the cargo room). The door lock actuator 305 works based on a signal transmitted from the body ECU 304. Note that the door lock actuator 305 may be configured to lock and unlock the vehicle-cabin door and the cargo-room door in the vehicle 10 independently.

The body ECU 304 is a computer for performing a body control of the vehicle 10. The body ECU 304 has a function to perform locking and unlocking of the vehicle-cabin door and the cargo-room door of the vehicle 10 at the same time or independently by controlling the door lock actuator 305 based on the lock command or the unlock command received from the verification ECU 303. Note that the verification ECU 303 and the body ECU 304 may be integrated.

Descriptions are now made of the key unit 100. The key unit 100 is a device placed at a predetermined position (for example, inside a glove compartment) in the vehicle cabin of the vehicle 10. The key unit 100 has a function to authenticate the user terminal 200 of the collection/delivery user via short-distance wireless communication with the user terminal 200 and the like, and a function to transmit a locking/unlocking signal by use of the RF band radio wave based on the authentication result. The key unit 100 is constituted by an LF receiver 101, an RF transmitter 102, a short-distance communication portion 103, and a controlling portion 104.

The LF receiver 101 is means to receive a polling signal transmitted from the locking/unlocking device 300 via the LF band radio wave. The LF receiver 101 includes an antenna (hereinafter referred to as an LF antenna) configured to receive the LF band radio wave. The RF transmitter 102 is means to transmit a locking/unlocking signal to the locking/unlocking device 300 via the RF band radio wave.

The short-distance communication portion 103 is means to communicate with the user terminal 200 of the collection/delivery user. The short-distance communication portion 103 performs communication in a short distance (to such a degree that communication can be performed between the inside of the vehicle cabin and the outside of the vehicle cabin) by use of a predetermined wireless communication standard. In the present embodiment, the short-distance communication portion 103 performs data communication by the Bluetooth (registered trademark) Low Energy standard (hereinafter referred to as BLE). The BLE is a low power telecommunications standard by Bluetooth and has a feature to start communication immediately by detecting a counterpart without requiring pairing between devices. Note that the present embodiment exemplifies the BLE, but other wireless communication standards are also usable. For example, a near field communication (NFC), an ultrawide band (UWB), WiFi (registered trademark), and the like can be used.

The controlling portion 104 is a computer configured to perform short-distance wireless communication with the user terminal 200 of the collection/delivery user via the short-distance communication portion 103 and to perform a control to authenticate the user terminal 200 and a control to transmit a locking/unlocking signal based on the authentication result. The controlling portion 104 is constituted by a microcomputer, for example.

The controlling portion 104 includes a storage portion 1041 and an authentication portion 1042. A control program to control the key unit 100 is stored in the storage portion 1041. The controlling portion 104 may implement various functions including the authentication portion 1042 by executing, by a CPU (not shown), control programs stored in the storage portion 1041. For example, the controlling portion 104 implements a function to receive a polling signal transmitted from the locking/unlocking device 300 as the LF band radio wave via the LF receiver 101, a function to transmit a locking/unlocking signal as the RF band radio wave to the locking/unlocking device 300 via the RF transmitter 102, a function to process communication with the user terminal 200 of the collection/delivery user via the short-distance communication portion 103, a function to generate a locking/unlocking signal when the authentication of the user terminal 200 of the collection/delivery user by the authentication portion 1042 is successful, and so on.

The authentication portion 1042 performs authentication on the user terminal 200 based on authentication information included in a lock request or an unlock request (hereinafter collectively referred to as a lock/unlock request) transmitted from the user terminal 200 of the collection/delivery user. More specifically, the authentication portion 1042 compares authentication information stored in the storage portion 1041 with the authentication information transmitted from the user terminal 200 of the collection/delivery user, and when they have a predetermined relationship, the authentication portion 1042 determines that the authentication is successful. When both pieces of authentication information do not satisfy the predetermined relationship, the authentication portion 1042 determines that the authentication is failure. Here, the predetermined relationship includes a case where the authentication information stored in the storage portion 1041 agrees with the authentication information transmitted from the user terminal 200 of the collection/delivery user, a case where processing results of predetermined encryption/decryption and the like using two pieces of authentication information agree with each other, a case where a result of a decryption process performed on one of the two pieces of authentication information agrees with the other one of them, and so on.

When the authentication portion 1042 successfully authenticates the user terminal 200 of the collection/delivery user, a locking/unlocking signal generated in response to a request received from the user terminal 200 is transmitted to the locking/unlocking device 300 via the RF transmitter 102. Hereinafter, the authentication information stored in the key unit 100 is referred to as device authentication information, and the authentication information transmitted from the user terminal 200 of the collection/delivery user is referred to as terminal authentication information, as needed for description.

Further, the key unit 100 transmits the key ID to the locking/unlocking device 300 together with the locking/unlocking signal. The key ID may be stored in the key unit 100 in advance as a plain text, or may be stored in an encrypted state where the key ID is encrypted by a cipher code inherent to the user terminal 200 of the collection/delivery user. When the key ID is stored in the encrypted state, the key ID thus encrypted may be decrypted by the authentication information transmitted from the user terminal 200 of the collection/delivery user, so that an original key ID may be obtained.

As such, the in-vehicle device 10A operates the locking/unlocking device 300 through the authentication process performed by the key unit 100, based on the authentication information transmitted from the user terminal 200 as a starting point, and executes a series of locking/unlocking processes of locking and unlocking the vehicle cabin and the cargo room of the vehicle 10.

Descriptions are now made of the user terminal 200 of the collection/delivery user. The user terminal 200 is a small computer such as a smartphone, a mobile phone, a tablet terminal, a personal information terminal, and a wearable computer (a smart watch and the like). Note that the user terminal 200 may be a personal computer (PC) connected to the collection/delivery management server 500 via the network N1 such as the Internet that is the public communication network, and the like. The user terminal 200 of the collection/delivery user is constituted by a short-distance communication portion 201, a communication portion 202, a controlling portion 203, and an input/output portion 204.

The short-distance communication portion 201 is means to communicate with the key unit 100 by the same telecommunications standard as the short-distance communication portion 103 of the key unit 100. The network formed between the short-distance communication portion 201 and the key unit 100 is indicated by N2 in FIG. 1. The communication portion 202 is communication means to connect the user terminal 200 to the network N1. In the present embodiment, the user terminal 200 can communicate with other devices (e.g., the collection/delivery management server 500 and so on) via the network N1 by use of a mobile communication service such as 3rd generation (3G) and long term evolution (LTE).

The controlling portion 203 is a computer for managing a control of the user terminal 200. The controlling portion 203 performs, for example, a process of acquiring the terminal authentication information, a process of generating a lock/unlock request including the acquired terminal authentication information, a process of transmitting the generated lock/unlock request to the key unit 100, and the like. Note that the controlling portion 203 is constituted by a microcomputer, for example, and implements a function to perform the various processes by causing a CPU (not shown) to execute programs stored in storage means (ROM and the like).

Further, the controlling portion 203 performs interaction with the collection/delivery user via the input/output portion 204. The input/output portion 204 is means to receive an input operation performed by the collection/delivery user and provide information to the collection/delivery user. More specifically, the input/output portion 204 is constituted by a touch panel, its control means, a liquid crystal display, and its control means. The touch panel and the liquid crystal display are constituted by one touch panel display in the present embodiment.

The controlling portion 203 displays an operation screen on the input/output portion 204 and generates a lock/unlock request corresponding to the operation performed by the collection/delivery user. For example, the controlling portion 203 outputs an icon for unlocking, an icon for locking, and the like to the touch panel display, and generates an unlock request or a lock request based on the operation performed by the collection/delivery user. Note that the operation performed by the collection/delivery user is not limited to an operation performed via the touch panel display. For example, the operation may be an operation performed via a hardware switch and the like.

Further, the controlling portion 203 performs a process of acquiring terminal authentication information from the center server 400. Note that the terminal authentication information is not information (a key ID) based on which the locking/unlocking device 300 authenticates the key unit 100, but is information based on which the key unit 100 authenticates the user terminal 200 (for example, authentication information corresponding to authentication information inherent to the key unit 100 provided in the vehicle 10). More specifically, the controlling portion 203 causes the communication portion 202 to transmit an issue request of terminal authentication information to the center server 400 via the collection/delivery management server 500. The "issue request of terminal authentication information" as used herein includes the identification information of the user terminal 200 and a signal for requesting an issue of terminal authentication information inherent to the key unit 100. The center server 400 that receives the issue request of terminal authentication information transmits the terminal authentication information inherent to the key unit 100 provided in the vehicle 10 to the user terminal 200. Hereby, an operation to unlock the vehicle 10 is performable on the user terminal 200. Note that, when the user terminal 200 does not have the terminal authentication information, a lock operation and an unlock operation from an operation screen to the vehicle 10 cannot be performed.

In the present embodiment, the terminal authentication information acquired by the user terminal 200 may be a one-time key that is invalidated when the cargo room door is locked along with the end of the collection/delivery operation by the collection/delivery user. For example, at the timing when the terminal authentication information transmitted from the center server 400 is received by the user terminal 200, the terminal authentication information is stored in a storage portion (not shown) of the user terminal 200, and after that, at the timing when the user terminal 200 receives a lock notice transmitted from the key unit 100 when the cargo room door is locked along with the end of the collection/delivery operation, the terminal authentication information is erased from the storage portion.

Note that the timing when the terminal authentication information stored in the storage portion of the user terminal 200 is erased is not limited to the above example, and may be the timing that has elapsed by a predetermined time from a point of time when the user terminal 200 receives the terminal authentication information transmitted from the center server 400 (a point of time when the center server 400 transmits the terminal authentication information toward the user terminal 200). Further, the terminal authentication information is not limited to the one-time key mentioned above and may be a limited key that is valid only during a predetermined time zone. Regardless of whether the terminal authentication information is a one-time key or a limited key, device authentication information corresponding to the terminal authentication information shall be stored in the key unit 100 in advance.

Descriptions are now made of the user terminal 50 of the client user. Similarly to the user terminal 200, the user terminal 50 may be a small computer such as a smartphone, a mobile phone, a tablet terminal, a personal information terminal, and a wearable computer (a smart watch and the like) or may be a personal computer. The user terminal 50 of the client user is constituted by a communication portion 51, a controlling portion 52, and an input/output portion 53.

The communication portion 51 is functionally equivalent to the communication portion 202 and is communication means to connect the user terminal 50 to the network N1. The controlling portion 52 is a computer for managing a control of the user terminal 50. The controlling portion 52 is constituted by a microcomputer, for example, and implements a function to perform various processes by causing a CPU (not shown) to execute programs stored in storage means (ROM and the like). For example, the controlling portion 52 performs the predetermined application so as to perform a collection/delivery request of a collection/delivery package to the collection/delivery management server 500 of a predetermined parcels delivery company via the input/output portion 53. The input/output portion 53 is also functionally similar to the input/output portion 204 and is means to receive an input operation performed by the client user and provide information to the client user.

Here, a screen on which the client user performs an input operation of the collection/delivery request of the collection/delivery package via the input/output portion 53 will be described with reference to FIG. 3. FIG. 3 exemplifies a collection/delivery information registration screen via which the client user registers collection/delivery information of a package. A collection/delivery information registration screen SC1 is provided by a predetermined application to use a service by the trunk share system 1. On the collection/delivery information registration screen SC1, respective fields for client user information SC11 (ID, full name), a collection/delivery package ID SC12, a collection/delivery category SC13, a collection/delivery destination vehicle SC14, a vehicle position SC15, a collection/delivery area SC16, and a collection/delivery unnecessary area SC17, and a registration button SC18 labelled with "REGISTRATION" are displayed.

The client user information SC11 (ID, full name) is a field to display information of the client user. The information of the client user is registered in advance by a predetermined application. The collection/delivery package ID SC12 is a field to input identification information of the collection/delivery package. The collection/delivery package ID may be a slip number of the collection/delivery package or may be numbered by the collection/delivery management server 500 at the time of registration of the collection/delivery information. The collection/delivery category SC13 is a field to select a category about whether a package as a collection/delivery target is to be delivered or collected. The collection/delivery destination vehicle SC14 is a field for the client user to select the vehicle 10 specified as a collection/delivery destination of the package. For example, in the collection/delivery destination vehicle SC14, the vehicle 10 registered in advance by a predetermined application in association with the client user is displayed as an option. The vehicle position SC15 is a field to input a parking position of the vehicle 10 designated by the client user as the collection/delivery destination. The client user can designate the parking position of the vehicle 10 as the collection/delivery destination by inputting the parking position of the vehicle 10 into the field of the vehicle position SC15. Note that, at the time of requesting collection/delivery, that is, at the time of registering collection/delivery information, the client user may not specifically input the parking position of the vehicle 10 as the collection/delivery destination into the field of the vehicle position SC15. In a case where the client user does not specify the parking position of the vehicle 10 as the collection/delivery destination, the collection/delivery user can acquire the parking position of the vehicle 10 from the center server 400 via the collection/delivery management server 500 at the time of collection/delivery. The collection/delivery area SC16 is a field to input the address of an area where the client user wants the package to be collected or delivered, e.g., a city/ward/town/village, a zip code, or the like. The field for the collection/delivery unnecessary area SC17 is a field to input the address of an area where the client user does not want the package to be collected or delivered, e.g., a city/ward/town/village, a zip code, or the like. The registration button SC18 is an operation button to transmit information selected or input on the collection/delivery information registration screen SC1 to the collection/delivery management server 500 as collection/delivery information. When the registration button SC18 is pressed, the collection/delivery management server 500 stores the received collection/delivery information in a collection/delivery management DB 503.

Note that, in FIG. 2, the user terminal 50 does not have a configuration corresponding to the short-distance communication portion 201 explicitly, but the user terminal 50 may have such a configuration so that the locking/unlocking device 300 is operated from the user terminal 50 such that the controlling portion 52 performs a process of acquiring terminal authentication information from the center server 400, like the controlling portion 203, and transmits the terminal authentication information to the key unit 100 via short-distance wireless communication.

Descriptions are now made of the collection/delivery management server 500. The collection/delivery management server 500 has a configuration of a general computer, and when a plurality of parcels delivery companies participates in the trunk share system 1, each of the parcels delivery companies prepares at least one collection/delivery management server as its own management server. The collection/delivery management server 500 is a computer including a processor (not shown) such as a central processing unit (CPU) or a digital signal processor (DSP), a main storage portion (not shown) such as a random access memory (RAM) and a read only memory (ROM), and an auxiliary storage portion (not shown) such as an erasable programmable ROM (EPROM), a hard disk drive (HDD), and a removable medium. Note that the removable medium is, for example, a universal serial bus (USB) memory, or a disc recording medium such as a compact disc (CD) and a digital versatile disc (DVD). In the auxiliary storage portion, an operating system (OS), various programs, various tables, and the like are stored, and a program stored therein is loaded in a working area of the main storage portion and executed so that each constituent part and the like is controlled via the execution of the program, thereby making it possible to implement a function corresponding to a predetermined object.

Further, the collection/delivery management server 500 includes a communication portion 501. The communication portion 501 is connected to other devices and performs communication between the collection/delivery management server 500 and the other devices (e.g., the center server 400, the user terminal 200, and the like). The communication portion 501 is, for example, a local area network (LAN) interface board or a radio communications circuit for wireless communication. The LAN interface board or the radio communications circuit is connected to the network N1 such as the Internet that is a public communication network.

Further, the collection/delivery management server 500 includes the collection/delivery management DB (database) 503 in which the collection/delivery information is stored. The collection/delivery management DB 503 is formed such that the collection/delivery information is stored in the auxiliary storage portion, and the client user is associated with the collection/delivery information therein. The collection/delivery management DB 503 is established such that a program of a database management system (DBMS) to be executed by a processor manages data to be stored in the auxiliary storage portion. The collection/delivery management DB 503 is, for example, a relational database.

Here, a configuration of the collection/delivery information stored in the collection/delivery management DB 503 will be described with reference to FIG. 4. FIG. 4 exemplifies data structure of the collection/delivery information. A collection/delivery information table in which the collection/delivery information is stored has fields for a client user ID, an article ID, a collection/delivery category, collection/delivery date and time, a collection/delivery destination vehicle ID, a collection/delivery area, a collection/delivery unnecessary area, and a collection/delivery status.

Identification information to specify the client user is stored in the client user ID field. Identification information of a package to be delivered or collected is stored in the collection/delivery package ID field. The collection/delivery package ID may be a slip number assigned to a package as a collection/delivery target by the parcels delivery company. Information to specify whether a collection/delivery package is delivered or collected by the collection/delivery user is stored in the collection/delivery category field. Information indicative of date and time when the collection/delivery package is collected or delivered is stored in the collection/delivery date and time field. Particularly, the collection/delivery time may be a specific time or may be a specific time zone during which collection/delivery is requested.

Identification information of the vehicle 10 designated by the client user as the collection/delivery destination is stored in the collection/delivery destination vehicle ID field. The collection/delivery destination vehicle ID is identification information of the vehicle 10 registered in advance by a predetermined application or the like in association with the client user ID. Information to specify an area where the client user wants the package to be collected or delivered is stored in the collection/delivery area field. The collection/delivery area is an area requested by a utilizer as a collection/delivery destination without specifying the parking position of the vehicle 10, and the collection/delivery area can be designated by a city/ward/town/village, an area specified by a zip code, or the like for example. Information to specify an area where the client user does not want the package to be collected or delivered is stored in the collection/delivery unnecessary area field. The collection/delivery unnecessary area is an area not requested by the utilizer as the collection/delivery destination, and the collection/delivery unnecessary area can be designated by a city/ward/town/village, an area specified by a zip code, or the like for example. Information indicative of whether collection/delivery of the collection/delivery package is completed by the collection/delivery user or not is stored in the collection/delivery status field. When collection/delivery of the collection/delivery package is completed, "COMPLETED" is set in the collection/delivery status field, and when collection/delivery of the collection/delivery package is not completed, "UNCOMPLETED" is set in the collection/delivery status field. Further, in a case where the vehicle 10 is not parked at a designated location or in a case where the vehicle 10 is parked in the collection/delivery unnecessary area, collection/delivery of the package is suspended, and "SUSPENDED" is set in the collection/delivery status.

Further, vehicle management information in which the client user is associated with the vehicle 10 as a corresponding collection/delivery place is also stored in the collection/delivery management DB 503. A configuration of the vehicle management information will be described with reference to FIG. 5. FIG. 5 exemplifies data structure of the vehicle management information. A vehicle management information table in which the vehicle management information is stored has fields for a client user ID, a collection/delivery destination vehicle ID, a vehicle type, a color, a number, and a vehicle position.

Identification information to specify the client user is stored in the client user ID field. Identification information of the vehicle 10 associated with the client user is stored in the collection/delivery destination vehicle ID field. The client user may be associated with a plurality of vehicles 10. In this case, the client user can designate different vehicles 10 as collection/delivery destinations for respective packages as collection/delivery targets. Information (the vehicle type, the color of the vehicle, the number thereof) to identify the vehicle 10 is stored in the vehicle type filed, the color field, and the number field so that the collection/delivery user can find the vehicle 10 designated as the collection/delivery destination. Information on the parking position of the vehicle 10 is stored in the vehicle position field. The vehicle position may be acquired by an input from the client user via the user terminal 50 or the positional information of the vehicle 10, grasped by the center server 400, may be acquired from the center server 400 via a data communication device (not shown) provided in the vehicle 10.

In the collection/delivery management server 500, a controlling portion 502 as a function part is formed by execution of a program by the processor. The controlling portion 502 performs a management control such as registration, update, and the like of the collection/delivery information to the collection/delivery management DB 503, and a management control such as a collection/delivery request to the user terminal 200 of the collection/delivery user and notification of the collection/delivery information. The controlling portion 502 includes a collection/delivery request portion 5021, a vehicle detection portion 5022, and a collection/delivery management portion 5023.

The collection/delivery request portion 5021 requests collection/delivery of the package to the user terminal 200 of the collection/delivery user, based on the collection/delivery information stored in the collection/delivery management DB 503. For example, when the collection/delivery request portion 5021 receives the request of collection/delivery of the package from the client user via the user terminal 50, the collection/delivery request portion 5021 generates collection/delivery information corresponding to the client user by associating identification information of the client user with identification information (a collection/delivery package ID) of the collection/delivery package, identification information (a collection/delivery destination vehicle ID) of the vehicle 10 as the collection/delivery destination, a collection/delivery area, and the like, and stores the collection/delivery information in the collection/delivery management DB 503. Further, in a case where notification of change of information on the collection/delivery date and time or the collection/delivery area is input from the client user after the collection/delivery information is generated, the collection/delivery information thus stored is updated according to the change. In terms of the collection/delivery information with a collection/delivery status of "UNCOMPLETED," the collection/delivery request portion 5021 notifies the user terminal 200 of the collection/delivery user of the collection/delivery information except information on a collection/delivery place that specifies the parking position of the vehicle 10, and thus, the collection/delivery request portion 5021 requests collection/delivery of the package. The collection/delivery user can move to the collection/delivery area designated as the collection/delivery destination for the collection/delivery package based on the collection/delivery information received by the user terminal 200.

The vehicle detection portion 5022 detects that the delivery vehicle 20 for collection/delivery of the collection/delivery package has moved to the collection/delivery area or that the vehicle 10 as the collection/delivery destination has moved to the collection/delivery unnecessary area. The vehicle detection portion 5022 acquires, for example, positional information measured based on a signal received by a GPS receiver provided in the delivery vehicle 20 via a data communication device (not shown) provided in the delivery vehicle 20, so that the vehicle detection portion 5022 can acquire positional information of the delivery vehicle 20. Note that the vehicle detection portion 5022 may acquire positional information of the user terminal 200 of the collection/delivery user via the network N1 and use it as the positional information of the delivery vehicle 20. Further, the vehicle detection portion 5022 can also acquire positional information of the vehicle 10 as the collection/delivery destination, similarly to the delivery vehicle 20. The vehicle detection portion 5022 can acquire the positional information of the vehicle 10 as the collection/delivery destination from the center server 400.

The vehicle detection portion 5022 can convert the positional information (information on the latitude and longitude by GPS) acquired for the delivery vehicle 20 or the vehicle 10 as the collection/delivery destination, into address information by use of a database of position reference information provided from public institutions and the like. When the converted address is included in the collection/delivery area or the collection/delivery unnecessary area, the vehicle detection portion 5022 can detect that the delivery vehicle 20 or the vehicle 10 as the collection/delivery destination has moved to the collection/delivery area or the collection/delivery unnecessary area. The vehicle detection portion 5022 acquires the positional information of these vehicles at predetermined intervals, so that the vehicle detection portion 5022 can detect that the delivery vehicle 20 has moved to the collection/delivery area or that the vehicle 10 as the collection/delivery destination has moved to the collection/delivery unnecessary area.

When it is detected that the delivery vehicle 20 has moved to the collection/delivery area, the collection/delivery management portion 5023 notifies the user terminal 200 of the collection/delivery user of information on the parking position of the vehicle 10 designated as the collection/delivery destination of the package. The collection/delivery user specifies the vehicle 10 as the collection/delivery destination by receiving the information on the parking position of the vehicle 10 by the user terminal 200, so that the collection/delivery user can collect or deliver the package.

When it is detected that the delivery vehicle 20 has moved to the collection/delivery area, the collection/delivery management portion 5023 acquires information on a current position of the vehicle 10 designated as the collection/delivery destination of the package, for example, from the center server 400. When the vehicle 10 is not present in the collection/delivery area, the collection/delivery management portion 5023 may transmit a notification to instruct to suspend the collection/delivery to the user terminal 200 of the collection/delivery user without notifying the user terminal 200 of information on the parking position of the vehicle 10.

In a case where the vehicle 10 as the collection/delivery destination is moving and the vehicle 10 is tracked for collection/delivery, when it is detected that the vehicle 10 has moved to the collection/delivery unnecessary area, the collection/delivery management portion 5023 may transmit, to the user terminal 200 of the collection/delivery user, a notification to instruct to suspend the collection/delivery.

Further, the collection/delivery management portion 5023 communicates with the user terminal 200 of the collection/delivery user via the communication portion 501 and updates information about the status of the collection/delivery package, included in the collection/delivery information. For example, the collection/delivery management portion 5023 receives, from the user terminal 200, status information (e.g., information indicative of completion of collection/delivery) input by the collection/delivery user via the input/output portion 204, and updates corresponding collection/delivery information. When the collection/delivery management portion 5023 instructs the user terminal 200 to suspend the collection/delivery, the collection/delivery management portion 5023 updates the collection/delivery status in the collection/delivery information table to "SUSPENDED."

Further, the collection/delivery management portion 5023 transmits an instruction of collection/delivery to the user terminal 200 so that the collection/delivery user can collect or deliver the collection/delivery package to the vehicle 10 based on the collection/delivery information and the vehicle management information associated with the client user. Note that the instruction of collection/delivery may be transmitted to the user terminal 200 not only once but several times. For example, on the day before a scheduled collection/delivery day, collection/delivery instructions related to collection/delivery on the next day may be collectively transmitted to the user terminal 200 of the collection/delivery user, and the collection/delivery instructions may be transmitted again on the scheduled collection/delivery day. Note that, in a case where the collection/delivery information is updated at the time of the second transmission, the update content is reflected.

Any of functional constituents of the collection/delivery management server 500 or some of processes thereof may be executed by other computers connected to the network N1. Further, a series of processes executed by the collection/delivery management server 500 can be executed by hardware and can be also executed by software.

Next will be described the center server 400. The center server 400 also has a configuration of a general computer and a basic hardware configuration thereof is the same as the collection/delivery management server 500. The center server 400 includes a processor (not shown), a main storage portion, and an auxiliary storage portion. Accordingly, a program stored in the auxiliary storage portion is loaded in a working area of the main storage portion and executed so that each constituent part and the like is controlled through the execution of the program, thereby making it possible to implement a function corresponding to a predetermined object. Further, the center server 400 also includes a communication portion 401. The communication portion 401 is functionally equivalent to the communication portion 501 included in the collection/delivery management server 500, and performs communication between the center server 400 and other devices (e.g., the collection/delivery management server 500 and so on).

Further, the center server 400 includes, in the auxiliary storage portion, a user information DB 403 in which various information is stored, and an authentication information DB 404. These databases (DB) are established such that a program of a database management system to be executed by a processor manages data to be stored in the auxiliary storage portion. The user information DB 403 and the authentication information DB 404 are, for example, relational databases.

Identification information of a user who uses the vehicle 10 (e.g., the collection/delivery user who delivers a collection/delivery package to the vehicle 10 or the client user who collects the collection/delivery package thus delivered), a password corresponding to the identification information, and the like are stored in the user information DB 403.

Authentication information of the vehicle 10 corresponding to the terminal authentication information is stored in the authentication information DB 404. The authentication information of the vehicle 10 is information associated with the identification information (key ID) of the vehicle 10 and can be identification information inherent to the key unit 100 provided in the in-vehicle device 10A, for example. Further, in addition to the authentication information of the vehicle 10, an effective period (including an effective time zone) of the authentication information, information on whether the authentication information expires or not, and the like may be stored in the authentication information DB 404. The effective period of the authentication information may be transmitted to the user terminal 200 of the collection/delivery user together with the authentication information. When the user terminal 200 of the collection/delivery user receives the effective period of the authentication information, the user terminal 200 can delete authentication information that exceeds its effective period, so as to invalidate the authentication information. Further, the information on whether the authentication information expires or not indicates whether the authentication information is transmitted to the user terminal 200 and is effective or the authentication information exceeds the effective period and expires. In a case where the authentication information is transmitted to the user terminal 200 and is effective, an authentication information management portion 4021 (described below) prevents the authentication information from being issued with an overlapped effective period, thereby making it possible to prevent redundant issues of the authentication information.

Further, in the center server 400, a controlling portion 402 as a function part is formed by execution of a program by the processor. The controlling portion 402 performs a control related to the issue of the authentication information to the user terminal 200 and the like. More specifically, the controlling portion 402 includes the authentication information management portion 4021 as a function part.

The authentication information management portion 4021 manages the issue of authentication information for locking or unlocking the vehicle 10. More specifically, the authentication information management portion 4021 receives an issue request of authentication information for locking or unlocking the vehicle 10 from the user terminal 200 of the collection/delivery user via the collection/delivery management server 500. The authentication information management portion 4021 receives the issue request of the authentication information and information on the user terminal 200 as a destination to which the authentication information is issued. The authentication information management portion 4021 transmits authentication information (terminal authentication information) corresponding to the key unit 100 to the user terminal 200 via the collection/delivery management server 500. The authentication information management portion 4021 may generate authentication information including information on an effective period. Even in a case where the key unit 100 of the in-vehicle device 10A receives the authentication information including the information on the effective period, when the effective period expires, the key unit 100 of the in-vehicle device 10A determines that the authentication information is invalid and does not execute locking or unlocking of the vehicle 10.

Any of functional constituents of the center server 400 or some of processes thereof may be executed by other computers connected to the network N1. Further, a series of processes executed by the center server 400 can be executed by hardware and can be also executed by software.

Procedure of Process

Figure 6:
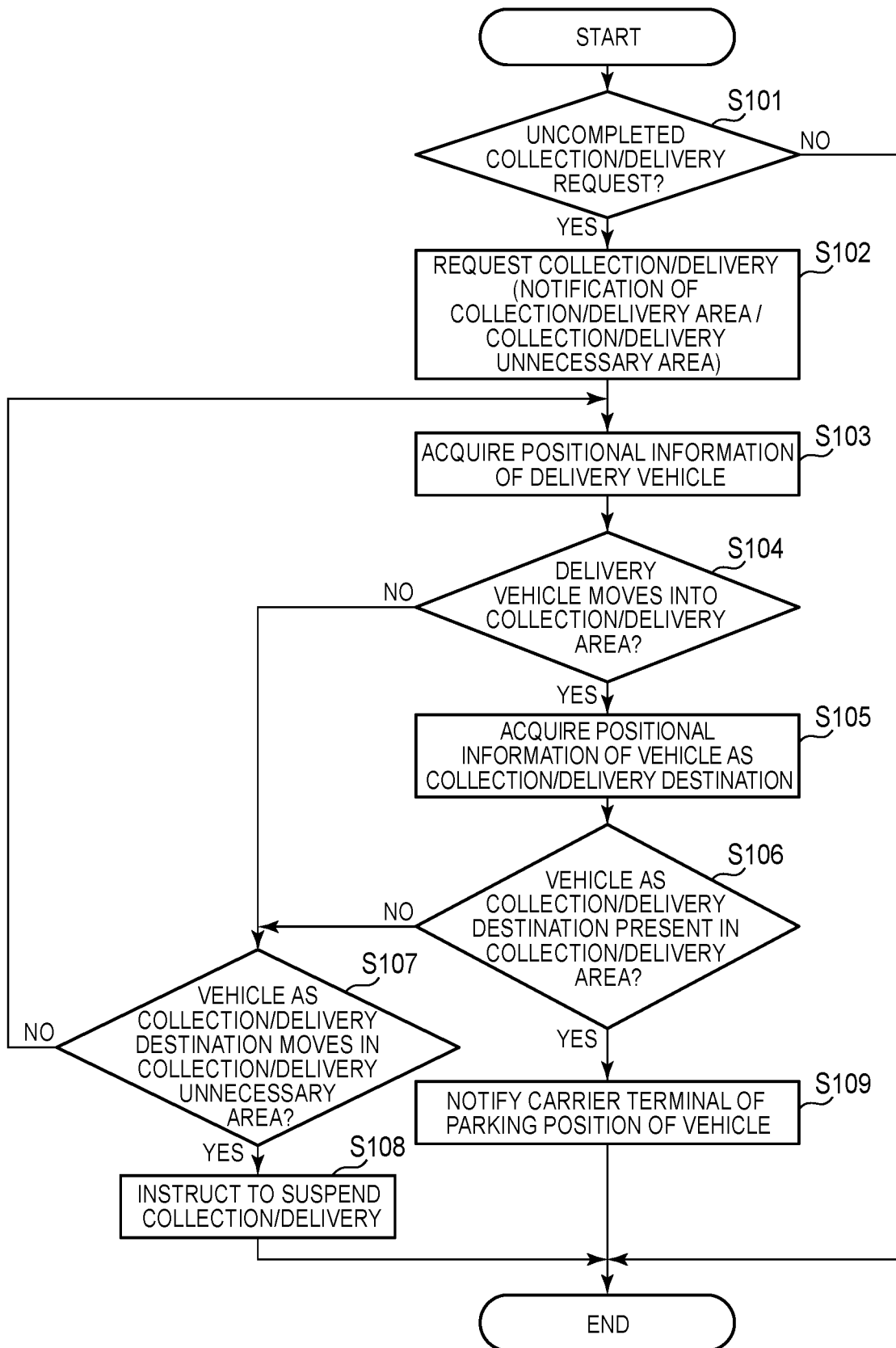
FIG. 6 is a flowchart exemplifying a collection/delivery destination notification process executed by the collection/delivery management server.

FIG. 6 is a flowchart exemplifying a collection/delivery destination notification process executed by the collection/delivery management server. The procedure of the process is started at the time when the collection/delivery management server 500 receives registration of collection/delivery information from the user terminal 50 of the client user, for example.

First, in S101, the collection/delivery request portion 5021 determines whether there is an uncompleted collection/delivery request or not. For example, the collection/delivery request portion 5021 determines whether there is collection/delivery information with a collection/delivery status of "UNCOMPLETED" in the collection/delivery information table of the collection/delivery management DB 503 or not, so that it can be determined whether there is an uncompleted collection/delivery request or not. When there is an uncompleted collection/delivery request (S101: Yes), the process proceeds to S102. When there is no uncompleted collection/delivery request (S101: No), the collection/delivery destination notification process illustrated in FIG. 6 is ended.

In S102, the collection/delivery request portion 5021 notifies the user terminal 200 of the collection/delivery user of collection/delivery information including a collection/delivery area requested by the client user as a collection/delivery destination, so as to request collection/delivery of a package as a collection/delivery target. Note that the collection/delivery information notified to the user terminal 200 in S102 does not include detailed information that specifies the parking position of the vehicle 10. The collection/delivery user starts moving to the collection/delivery area based on information on the collection/delivery area, received by the user terminal 200.

Note that the collection/delivery request portion 5021 may include, in the collection/delivery information, information on a collection/delivery unnecessary area where the client user does not want the package to be collected or delivered. Hereby, for example, in a case where the vehicle 10 as the collection/delivery destination is tracked for collection/delivery of the package while the vehicle 10 is moving, when it is detected that the vehicle 10 as the collection/delivery destination has entered the collection/delivery unnecessary area, it is possible to instruct the user terminal 200 of the collection/delivery user to suspend the collection/delivery of the package.

In S103, the vehicle detection portion 5022 acquires positional information of the delivery vehicle 20 during its movement. The vehicle detection portion 5022 can acquire, as the positional information of the delivery vehicle 20, positional information measured based on a signal received by the GPS receiver provided in the delivery vehicle 20 or positional information of the user terminal 200 of the collection/delivery user, via the network N1. The process of S103 is performed repeatedly at predetermined intervals, so that the vehicle detection portion 5022 can detect that the delivery vehicle 20 has moved into the collection/delivery area.

In S104, the vehicle detection portion 5022 determines whether or not the delivery vehicle 20 has moved into the collection/delivery area. The vehicle detection portion 5022 converts the positional information of the delivery vehicle 20, acquired in S103, into address information and determines whether or not the converted address is included in the collection/delivery area notified to the user terminal 200 of the collection/delivery user in S102. When the converted address is included in the collection/delivery area, the vehicle detection portion 5022 can determine that the delivery vehicle 20 has moved into the collection/delivery area. When it is determined (detected) that the delivery vehicle 20 has moved into the collection/delivery area (S104: Yes), the process proceeds to S105. When it is not determined that the delivery vehicle 20 has moved into the collection/delivery area (S104: No), the process proceeds to S107.

In S105, the collection/delivery management portion 5023 acquires positional information of the vehicle 10 as the collection/delivery destination. The collection/delivery management portion 5023 can acquire the positional information of the vehicle 10 as the collection/delivery destination via the center server 400, for example.

In S106, the collection/delivery management portion 5023 determines whether or not the vehicle 10 as the collection/delivery destination is present in the collection/delivery area or not. The collection/delivery management portion 5023 converts the positional information of the vehicle 10 as the collection/delivery destination, acquired in S105, into address information and determines whether or not the converted address is included in the collection/delivery area notified to the user terminal 200 of the collection/delivery user in S102. When the converted address is included in the collection/delivery area, the vehicle detection portion 5022 can determine that the vehicle 10 as the collection/delivery destination is present in the collection/delivery area. When it is determined that the vehicle 10 as the collection/delivery destination is present in the collection/delivery area (S106: Yes), the process proceeds to S109. When it is determined that the vehicle 10 as the collection/delivery destination is not present in the collection/delivery area (S106: No), the collection/delivery destination notification process illustrated in FIG. 6 is ended.

In S107, the vehicle detection portion 5022 determines whether or not the vehicle 10 as the collection/delivery destination has moved into the collection/delivery unnecessary area. The vehicle detection portion 5022 converts the positional information of the vehicle 10 as the collection/delivery destination, acquired in S105, into address information and determines whether or not the converted address is included in the collection/delivery unnecessary area. Note that information on the collection/delivery unnecessary area is included in the collection/delivery information notified to the user terminal 200 in S102. When the converted address is included in the collection/delivery unnecessary area, the vehicle detection portion 5022 can determine that the vehicle 10 as the collection/delivery destination has moved into the collection/delivery unnecessary area. When it is determined (detected) that the vehicle 10 as the collection/delivery destination has moved into the collection/delivery unnecessary area (S107: Yes), the process proceeds to S108. When it is not determined that the vehicle 10 as the collection/delivery destination has moved into the collection/delivery unnecessary area (S107: No), the process returns to S103.

Note that the process of S107 is a process assumed when the vehicle 10 as the collection/delivery destination is moving and the package is to be collected or delivered by tracking the position of the vehicle 10. That is, due to the tracking of the vehicle 10, there occurs a case where the vehicle 10 moves into the collection/delivery unnecessary area where the client user does not want the package to be collected or delivered. The vehicle detection portion 5022 can detect that the vehicle 10 as the collection/delivery destination has moved into the collection/delivery unnecessary area notified in S102. When it is detected that the vehicle 10 as the collection/delivery destination has moved into the collection/delivery unnecessary area, the collection/delivery management portion 5023 instructs the user terminal 200 of the collection/delivery user to suspend the collection/delivery of the package. Hereby, the collection/delivery user can suspend the collection/delivery by tracking in the collection/delivery unnecessary area.

In S108, the collection/delivery management portion 5023 detects that the vehicle 10 as the collection/delivery destination is not present in the collection/delivery area and the vehicle 10 has moved into the collection/delivery unnecessary area, and the collection/delivery management portion 5023 instructs the user terminal 200 of the collection/delivery user to suspend the collection/delivery of the package. In order to instruct to suspend the collection/delivery, the collection/delivery management portion 5023 may display a message that instructs to suspend the collection/delivery on the input/output portion 204 via a predetermined application installed in the user terminal 200 of the collection/delivery user, for example. Further, the collection/delivery management portion 5023 may transmit, to the user terminal 200 of the collection/delivery user, a message that instructs to suspend the collection/delivery by an E-mail, a short message service (SMS), a multimedia messaging service (MMS), and the like. When the collection/delivery is suspended, the collection/delivery request portion 5021 may notify the user terminal 50 of the client user that the collection/delivery of the package is suspended, via a predetermined application or an E-mail, an SMS, an MMS, and the like.

In S109, the collection/delivery management portion 5023 notifies a parking position of the vehicle 10 as the collection/delivery destination to the user terminal 200 of the collection/delivery user. When the vehicle 10 as the collection/delivery destination is not parked, the collection/delivery management portion 5023 may transmit, to the user terminal 50 of the client user, a notification to urge the client user to park the vehicle 10. When the vehicle 10 is parked, the collection/delivery management portion 5023 notifies the user terminal 200 of the collection/delivery user of its parking position. The parking position of the vehicle 10 as the collection/delivery destination is notified to the user terminal 200 of the collection/delivery user, and the collection/delivery destination notification process illustrated in FIG. 6 is ended.

The collection/delivery user identifies the vehicle 10 as the collection/delivery destination based on the parking position of the vehicle 10 notified to the user terminal 200. The collection/delivery user requests authentication information to unlock the vehicle 10 from the user terminal 200 of the collection/delivery user to the collection/delivery management server 500. The collection/delivery management server 500 requests the center server 400 to transmit, to the user terminal 200 of the collection/delivery user, the authentication information to unlock the vehicle 10. The collection/delivery management server 500 may acquire the authentication information from the center server 400 and transmit it to the user terminal 200 of the collection/delivery user from the collection/delivery management server 500. Further, the collection/delivery management portion 5023 of the collection/delivery management server 500 may notify the user terminal 200 of the collection/delivery user of the authentication information to unlock the vehicle 10 together with the parking position of the vehicle 10.

Effects of First Embodiment

When the trunk share system 1 detects that the delivery vehicle 20 has moved into the collection/delivery area, the trunk share system 1 notifies the user terminal 200 of the collection/delivery user of the parking position of the vehicle 10 as the collection/delivery destination. Until the delivery vehicle 20 has moved into the collection/delivery area, the trunk share system 1 does not notify the user terminal 200 of the collection/delivery user of information on a specific parking position of the vehicle 10 as the collection/delivery destination. Hereby, the information of the parking position of the vehicle 10 as the collection/delivery destination is not provided to a carrier in an unnecessary manner, thereby making it possible to protect the privacy of the client user. Further, the client user may not specify a final parking position of the vehicle 10 as the collection/delivery destination at the time of requesting collection/delivery, so that flexible collection and delivery of a collection/delivery package can be achieved.

Even in a case where the delivery vehicle 20 has moved into the collection/delivery area, when the vehicle 10 as the collection/delivery destination is moving, for example, there occurs such a case where the vehicle 10 is not present in the collection/delivery area. In a case where the vehicle 10 as the collection/delivery destination is not present in the collection/delivery area, the trunk share system 1 does not notify the user terminal 200 of the collection/delivery user of the information on the parking position of the vehicle 10 as the collection/delivery destination. Hereby, the information on the parking position of the vehicle 10 is not provided to the carrier in an unnecessary manner, thereby making it possible to protect the privacy of the client user.

When it is detected that the vehicle 10 as the collection/delivery destination has moved into the collection/delivery unnecessary area where the client user does not want a package to be collected or delivered by tracking, the trunk share system 1 notifies the user terminal 200 of the collection/delivery user of an instruction to suspend collection/delivery of the package. Hereby, it is possible not to permit collection/delivery of the package in the collection/delivery unnecessary area, so that the privacy of the client user is protected.

When the collection/delivery of the package is suspended, the trunk share system 1 notifies the user terminal 50 of the client user that the collection/delivery of the package is suspended. Hereby, the client user can recognize that the collection/delivery of the package is suspended and can request recollection/redelivery.

When the vehicle 10 as the collection/delivery destination is not parked, the trunk share system 1 transmits, to the user terminal 50 of the client user, a notification to urge the client user to park the vehicle 10. When the vehicle 10 is parked, the user terminal 200 of the collection/delivery user acquires a parking position of the vehicle 10, so that the collection/delivery user can easily collect or deliver the package.

Second Embodiment

In the second embodiment, when the collection/delivery of the package is suspended because the vehicle 10 as the collection/delivery destination is not present in the collection/delivery area or has moved into the collection/delivery unnecessary area, the collection/delivery management server 500 receives a request of recollection/redelivery from the client user. After the request of recollection/redelivery is received, a process of recollecting or redelivering the package is performed in a similar manner to the process of collection/delivery in the first embodiment, so detailed descriptions thereof are omitted herein. The following describes a process of receiving a request of recollection/redelivery.

FIG. 7 is a flowchart exemplifying a recollection/redelivery receiving process. The procedure of the process is started at the time when the collection/delivery management server 500 notifies the user terminal 200 of the collection/delivery user of an instruction to suspend collection/delivery of a package.

First, in S201, the collection/delivery request portion 5021 determines whether there is suspended collection/delivery information. For example, the collection/delivery request portion 5021 determines whether there is collection/delivery information with a collection/delivery status of "SUSPENDED" in the collection/delivery information table of the collection/delivery management DB 503 or not, so that it can be determined whether there is suspended collection/delivery information or not. When there is suspended collection/delivery information (S201: Yes), the process proceeds to S202. When there is no suspended collection/delivery information (S201: No), the recollection/redelivery receiving process illustrated in FIG. 7 is ended.

In S202, the collection/delivery request portion 5021 notifies the user terminal 50 of the client user that the collection/delivery is suspended. The collection/delivery request portion 5021 may display, on the input/output portion 53, a message that notifies that the collection/delivery is suspended via a predetermined application installed in the user terminal 50 of the client user. Further, the collection/delivery request portion 5021 may notify that the collection/delivery of the package is suspended, via an E-mail, an SMS, an MMS, and the like.

In S203, the collection/delivery request portion 5021 determines whether there is a recollection/redelivery request or not. The client user can display the collection/delivery information registration screen (illustrated in FIG. 3) via a predetermined application installed in the user terminal 50 and register collection/delivery information for recollection/redelivery, for example. The registered collection/delivery information is transmitted to the collection/delivery management server 500, so that its corresponding collection/delivery information in the collection/delivery information table is updated (reset). When the collection/delivery information for recollection/redelivery is registered, the collection/delivery request portion 5021 can determine that there is a recollection/redelivery request. When there is a recollection/redelivery request (S203: Yes), the process proceeds to S204. When there is no recollection/redelivery request (S203: No), the process illustrated in FIG. 7 is ended.

In S204, the collection/delivery request portion 5021 acquires collection/delivery information reset by the recollection/redelivery request. In S205, based on the collection/delivery information acquired in S204, the same processes as the processes of S102 to S109 in FIG. 7 are executed, so that the process illustrated in FIG. 7 is ended.

Effects of Second Embodiment

In the trunk share system 1, when collection/delivery of a package is suspended, the collection/delivery user can recollect or redeliver the suspended package by acquiring information on a collection/delivery area reset in the user terminal 50 of the client user.

Recording Medium

A program to cause a computer, other machines, and devices (hereinafter referred to as the computer and the like) to implement the issue control can be recorded in a recording medium readable by the computer and the like. By causing the computer and the like to read and execute the program in the recording medium, the computer functions as the center server 400.

Here, the recording medium readable by the computer and the like is a non-transitory recording medium in which information such as data or a program is stored electrically, magnetically, optically, mechanically, or chemically and from which the information can be read by the computer or the like. In such a recording medium, a recording medium that is removable from the computer and the like is, for example, a flexible disk, a magneto-optical disk, a CD-ROM, a CD-R/W, a DVD, a Blu-ray disk, a DAT, an 8-mm tape, a memory card such as a flash memory, and the like. Further, a recording medium fixed to the computer and the like includes a hard disk, a ROM (read-only memory), and the like. Further, a solid state drive (SSD) is also usable as a recording medium removable from the computer and the like or a recording medium fixed to the computer and the like.

What is claimed is:

1. A system comprising:
  a collection/delivery destination vehicle, and a processor of a collection/delivery management server that manages sharing of spaces of vehicles for collection or delivery of packages, the processor configured to:

notify, to a terminal of a carrier who collects or delivers a package in collaboration with the collection/delivery management server, information on a collection/delivery area where a utilizer who requests collection or delivery of the package wants the package to be collected or delivered and information on a collection/delivery unnecessary area where the utilizer does not want the package to be collected or delivered in a same notification of collection/delivery information, the collection/delivery area being designated by at least one of a city, ward, town, village, or a zip code without specifying a parking position, and the collection/delivery unnecessary area being designated by at least one of a city, ward, town, village, or a zip code without specifying a parking position;

when it is detected that a delivery vehicle by which the carrier using the terminal of the carrier collects or delivers the package has moved into the collection/delivery area using positional information measured based on a signal received by a GPS receiver provided in the delivery vehicle and the collection/delivery destination vehicle is present in the collection/delivery area, notify the terminal of the carrier of information on the parking position of the collection/delivery destination vehicle; and when the collection/delivery destination vehicle has moved into the collection/delivery unnecessary area, notify the terminal of the carrier of an instruction to suspend the collection or delivery of the package without notifying the terminal of the carrier of the information on the parking position of the collection/delivery destination vehicle, wherein
the collection/delivery destination vehicle includes:
a locking/unlocking device configured to unlock the collection/delivery destination vehicle; and
a controller configured to transmit a locking/unlocking signal for unlocking the collection/delivery destination vehicle to the locking/unlocking device based on an authentication result of authenticating the terminal of the carrier based upon device authentication information and terminal authentication information received by the terminal of the carrier, and
the locking/unlocking device automatically unlocks the collection/delivery destination vehicle in response to receipt of the locking/unlocking signal such that the package is able to be collected or delivered.

2. The system according to claim 1, wherein, when it is detected that the delivery vehicle has moved into the collection/delivery area, the processor is configured to determine whether or not the collection/delivery destination vehicle is present in the collection/delivery area.

3. The system according to claim 1, wherein, when it is detected that the delivery vehicle has moved into the collection/delivery area and the collection/delivery destination vehicle is not present in the collection/delivery area, the processor is configured to notify the terminal of the carrier of the instruction to suspend the collection or delivery of the package without notifying the terminal of the carrier of the information on the parking position of the collection/delivery destination vehicle.

4. The system according to claim 1, wherein, when the terminal of the carrier is notified of the instruction to suspend the collection or delivery of the package, the processor is configured to notify a terminal of the utilizer that the collection or delivery of the package is suspended.

5. The system according to claim 1, wherein, when the collection/delivery destination vehicle is not parked, the processor is configured to transmit, to a terminal of the utilizer, a notification to urge the utilizer to park the collection/delivery destination vehicle.

6. The system according to claim 1, wherein, when the terminal of the carrier is notified of the instruction to suspend the collection or delivery of the package, the processor is configured to acquire information on the collection/delivery area reset by a terminal of the utilizer.

7. A method comprising:
notifying, to a terminal of a carrier who collects or delivers a package in collaboration with a collection/delivery management server that manages sharing of spaces of vehicles for collection or delivery of packages, information on a collection/delivery area where a utilizer who requests collection or delivery of the package wants the package to be collected or delivered and information on a collection/delivery unnecessary area where the utilizer does not want the package to be collected or delivered in a same notification of collection/delivery information, the collection/delivery area being designated by at least one of a city, ward, town, village, or a zip code without specifying a parking position, and the collection/delivery unnecessary area being designated by at least one of a city, ward, town, village, or a zip code without specifying a parking position;

detecting that a delivery vehicle by which the carrier using the terminal of the carrier collects or delivers the package has moved into the collection/delivery area using positional information measured based on a signal received by a GPS receiver provided in the delivery vehicle;

detecting a position of a collection/delivery destination vehicle with respect to the collection/delivery area or the collection/delivery unnecessary area;

when it is detected that the delivery vehicle by which the carrier using the terminal of the carrier collects or delivers the package has moved into the collection/delivery area and the collection/delivery destination vehicle is present in the collection/delivery area, notifying the terminal of the carrier of information on the parking position of the collection/delivery destination vehicle; and when the collection/delivery destination vehicle has moved into the collection/delivery unnecessary area, notifying the terminal of the carrier of an instruction to suspend the collection or delivery of the package without notifying the terminal of the carrier of the information on the parking position of the collection/delivery destination vehicle, wherein the collection/delivery destination vehicle includes:
a locking/unlocking device configured to unlock the collection/delivery destination vehicle; and
a controller configured to transmit a locking/unlocking signal for unlocking the collection/delivery destination vehicle to the locking/unlocking device based on an authentication result of authenticating the terminal of the carrier based upon device authentication information and terminal authentication information received by the terminal of the carrier, and the locking/unlocking device automatically unlocks the collection/delivery destination vehicle in response to receipt of the locking/unlocking signal such that the package is able to be collected or delivered.

8. The method according to claim 7, further comprising, when it is detected that the delivery vehicle has moved into the collection/delivery area, determining whether or not the collection/delivery destination vehicle is present in the collection/delivery area.

9. The method according to claim 7, further comprising:
detecting that the collection/delivery destination vehicle is not present in the collection/delivery area; and
when it is detected that the delivery vehicle has moved into the collection/delivery area and the collection/delivery destination vehicle is not present in the collection/delivery area, notifying the terminal of the carrier of the instruction to suspend the collection or delivery of the package without notifying the terminal of the carrier of the information on the parking position of the collection/delivery destination vehicle.

10. The method according to claim 7, further comprising, when the terminal of the carrier is notified of the instruction to suspend the collection or delivery of the package, notifying a terminal of the utilizer that the collection or delivery of the package is suspended.

11. The method according to claim 7, further comprising:
determining that the collection/delivery destination vehicle is not parked; and
when the collection/delivery destination vehicle is not parked, transmitting, to a terminal of the utilizer, a notification to urge the utilizer to park the collection/delivery destination vehicle.

12. The method according to claim 7, further comprising, when the terminal of the carrier is notified of the instruction to suspend the collection or delivery of the package, acquiring information on the collection/delivery area reset by a terminal of the utilizer.

13. A non-transitory computer readable medium storing instructions, which when executed by a computer cause the computer to perform a method, the method comprising:
notifying, to a terminal of a carrier who collects or delivers a package in collaboration with a collection/delivery management server that manages sharing of spaces of vehicles for collection or delivery of packages, information on a collection/delivery area where a utilizer who requests collection or delivery of the package wants the package to be collected or delivered and information on a collection/delivery unnecessary area where the utilizer does not want the package to be collected or delivered in a same notification of collection/delivery information, the collection/delivery area being designated by at least one of a city, ward, town, village, or a zip code without specifying a parking position, and the collection/delivery unnecessary area being designated by at least one of a city, ward, town, village, or a zip code without specifying a parking position;
detecting that a delivery vehicle by which the carrier using the terminal of the carrier collects or delivers the package has moved into the collection/delivery area using positional information measured based on a signal received by a GPS receiver provided in the delivery vehicle;
detecting a position of a collection/delivery destination vehicle with respect to the collection/delivery area or the collection/delivery unnecessary area;
when it is detected that the delivery vehicle by which the carrier using the terminal of the carrier collects or delivers the package has moved into the collection/delivery area and the collection/delivery destination vehicle is present in the collection/delivery area, notifying the terminal of the carrier of information on the parking position of the collection/delivery destination vehicle; and
when the collection/delivery destination vehicle has moved into the collection/delivery unnecessary area, notifying the terminal of the carrier of an instruction to suspend the collection or delivery of the package without notifying the terminal of the carrier of the information on the parking position of the collection/delivery destination vehicle, wherein
the collection/delivery destination vehicle includes:
a locking/unlocking device configured to unlock the collection/delivery destination vehicle; and
a controller configured to transmit a locking/unlocking signal for unlocking the collection/delivery destination vehicle to the locking/unlocking device based on an authentication result of authenticating the terminal of the carrier based upon device authentication information and terminal authentication information received by the terminal of the carrier, and
the locking/unlocking device automatically unlocks the collection/delivery destination vehicle in response to receipt of the locking/unlocking signal such that the package is able to be collected or delivered.

14. The non-transitory computer readable medium according to claim 13, wherein the method further comprises, when it is detected that the delivery vehicle has moved into the collection/delivery area, determining whether or not the collection/delivery destination vehicle is present in the collection/delivery area.

15. The non-transitory computer readable medium according to claim 13, wherein the method further comprises:
detecting that the collection/delivery destination vehicle is not present in the collection/delivery area; and
when it is detected that the delivery vehicle has moved into the collection/delivery area and the collection/delivery destination vehicle is not present in the collection/delivery area, notifying the terminal of the carrier of the instruction to suspend the collection or delivery of the package without notifying the terminal of the carrier of the information on the parking position of the collection/delivery destination vehicle.

16. The non-transitory computer readable medium according to claim 13, wherein the method further comprises, when the terminal of the carrier is notified of the instruction to suspend the collection or delivery of the package, notifying a terminal of the utilizer that the collection or delivery of the package is suspended.

17. The non-transitory computer readable medium according to claim 13, wherein the method further comprises:
determining that the collection/delivery destination vehicle is not parked; and
when the collection/delivery destination vehicle is not parked, transmitting, to a terminal of the utilizer, a notification to urge the utilizer to park the collection/delivery destination vehicle.

18. The non-transitory computer readable medium according to claim 13, wherein the method further comprises, when the terminal of the carrier is notified of the instruction to suspend the collection or delivery of the package, acquiring information on the collection/delivery area reset by a terminal of the utilizer.

* * * * *